United States Patent
Postnikov et al.

(10) Patent No.: US 7,657,091 B2
(45) Date of Patent: Feb. 2, 2010

(54) METHOD FOR AUTOMATIC REMOVAL OF TEXT FROM A SIGNATURE AREA

(75) Inventors: Vasily Postnikov, Moscow (RU); Grigori Nepomniachtchi, San Diego, CA (US)

(73) Assignee: Mitek Systems, Inc., San Diego, CA (US)

( * ) Notice: Subject to any disclaimer, the term of this patent is extended or adjusted under 35 U.S.C. 154(b) by 760 days.

(21) Appl. No.: 11/369,201

(22) Filed: Mar. 6, 2006

(65) Prior Publication Data

US 2007/0205261 A1 Sep. 6, 2007

(51) Int. Cl.
*G06K 9/00* (2006.01)

(52) U.S. Cl. .................... 382/178; 382/137
(58) Field of Classification Search ............. 382/119, 382/137, 140, 176, 178, 186
See application file for complete search history.

(56) References Cited

U.S. PATENT DOCUMENTS

| | | | | |
|---|---|---|---|---|
| 5,751,842 A | * | 5/1998 | Riach et al. | 382/137 |
| 7,020,320 B2 | * | 3/2006 | Filatov | 382/137 |
| 2007/0110311 A1 | * | 5/2007 | Houle et al. | 382/186 |

* cited by examiner

*Primary Examiner*—Phuoc Tran
(74) *Attorney, Agent, or Firm*—Sheppard Mullin Richter & Hampton; David E. Heisey (57) ABSTRACT

The present invention provides a method for processing a document involving the automatic removal of text from a predetermined area of a document, the method comprising inputting a bitmap containing the predetermined area of the document from which the text will be removed wherein the predetermined area contains handwritten strokes, detecting the text, removing the text and any handwritten strokes that intersect with the text and outputting the bitmap with the text removed therefrom.

20 Claims, 5 Drawing Sheets

METHOD FOR AUTOMATIC REMOVAL OF TEXT FROM A SIGNATURE AREA

FIELD OF THE INVENTION

This invention relates to automated document processing, and more particularly to a method for processing financial documents involving the automatic removal of text from the signature area of the financial document.

BACKGROUND OF THE INVENTION

In general, financial institutions have automated most check processing systems by printing financial documents, such as account numbers and bank routing numbers onto the checks. Before a check amount is deducted from a payer's account, the amount, account number, and other important information must be extracted from the check. The highly automated form of extraction is done by a check processing control system that captures information from the Magnetic Ink Character Recognition ("MICR") line. The MICR line consists of specially designed numerals that are printed on the bottom of a check using magnetic ink. The MICR data fields include the bank routing number, bank transit number, account number, check serial number, check amount, process code and extended process code.

Signature validation systems, such as described in copending U.S. patent application Ser. Nos. 11/009,252, 11/008,893, 11/009,251, 11/204,909, and 11/249,788, may be employed to validate the authenticity of a signature on a financial document such as a check. The contents of these patent applications are hereby incorporated by reference in their entirety. These signature validation systems comprise computer software programs for detecting fraudulent checks and verifying non-fraudulent checks at various points of presentment such as teller stations and retail stores.

The signature area on many checks and other documents frequently includes extraneous writing such as machine-printed text (e.g., various citations and stamps such as "Authorized Signature"). The presence of machine-printed text and other extraneous writing puts an extra burden on signature validation systems, such as described above, since the extraneous writing comprises noise which distorts the resultant confidence score.

In view of the above drawbacks, there exists a need for a system and method of processing financial documents involving the automatic removal of machine-printed text from the signature area.

SUMMARY OF THE INVENTION

In view of the foregoing, it is an object of the present invention to provide a system and method of processing financial documents involving the automatic removal of machine-printed text from the signature area.

One aspect of the present invention involves a method for processing a document involving the automatic removal of text such as machine-printed text and other extraneous writing from a predetermined area of a document, the method comprising inputting a bitmap containing the predetermined area of the document from which the text will be removed, wherein the predetermined area contains handwritten strokes, detecting the text, removing the text and any handwritten strokes that intersect with the text and outputting the bitmap with the text removed therefrom. In a preferred embodiment of the invention, the document comprises a financial document such as a check and the predetermined area comprises the signature area of the financial document. These steps may be repeated iteratively to remove additional extraneous writing from the predetermined area of the bitmap.

The above-identified method may further comprise the step of restoring any handwritten strokes that were removed from the predetermined area of the document. In addition, the step of detecting the text may comprise the steps of calculating a dominant letter height of the text, computing text baselines and slope of the text, and computing left and right boundaries of the text. Further, the step of removing the text and any handwritten strokes that intersect with the text may include the steps of re-computing local baselines of the text, detecting intersections of handwritten strokes and text, and removing rough text from the re-computed local baselines.

Another aspect of the invention involves a method for processing a document, comprising inputting a bitmap containing a predetermined area of the document, wherein the predetermined area contains handwritten strokes and text (and/or other extraneous writing), detecting the text, removing the text and any handwritten strokes that intersect with the text, restoring any handwritten strokes that were previously removed from the predetermined area of the document and outputting the bitmap with the text removed therefrom.

Similar to the previous method, the step of detecting the text includes the step of calculating a dominant letter height of the text, which involves building a compressed image representation having a predetermined aspect ratio. Additionally, the step of detecting the text includes computing text baselines and slope of the text and computing left and right boundaries of the text. Text removal involves re-computing local baselines of the text and detecting intersections of handwritten strokes and text, which includes tracing the handwritten strokes to effectively separate the handwritten strokes from the text. In addition, the step of restoring handwritten strokes comprises repairing the predetermined area of the document by pasting any previously collected and saved handwritten strokes back onto the bitmap.

BRIEF DESCRIPTION OF THE DRAWINGS

FIG. 5(*a*) illustrates the signature area of a financial document comprising a signature and a machine-printed text line, wherein a signature section is provided that contains points of intersection between the text and the signature, whereas FIG. 5(*b*) illustrates the signature section wherein the text has been removed;

FIG. 6(*a*) illustrates the signature area of a financial document comprising a signature and a machine-printed text line, wherein the rough text has been whited out, whereas FIG. 6(*b*) illustrates the signature area after the signature has been repaired;

FIG. 7(*a*) illustrates the signature area of a financial document including machine-printed text comprising an inscription that is located substantially underneath a signature, whereas

FIG. 8(a) illustrates the signature area of a financial document including machine-printed text comprising a citation that intersects with a signature; whereas FIG. 9(a) illustrates the endorsement area of a financial document including machine-printed text comprising a machine-printed number sequence that intersects with the endorsement, whereas

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

As discussed above, most financial documents include extraneous writing such as machine-printed text. When the text appears in the signature area of the document, an additional burden is placed on signature validation systems due to distortions when reading the signature area. The present invention is directed to the removal of the text and other types of "noise" that may be present in the signature area of financial documents. As would be appreciated by those of skill in the art, the principles of the present invention are applicable beyond signature validation on checks or even signature validation in general. For example, the systems and methods described herein may be employed to remove machine-printed text or other noise from any document. Moreover, the handwriting repair methods of the invention are applicable to handwriting other than signatures.

The present invention provides a system and method for automatic removal of text from a predetermined area of a document. The system and method preferably are implemented using computer software programs comprising machine readable instructions for running an algorithm for the automatically removal the text from the signature area of the document. The computer software preferably is adapted to be installed on a personal computer running a Microsoft Windows or other operating system.

Figure 1:
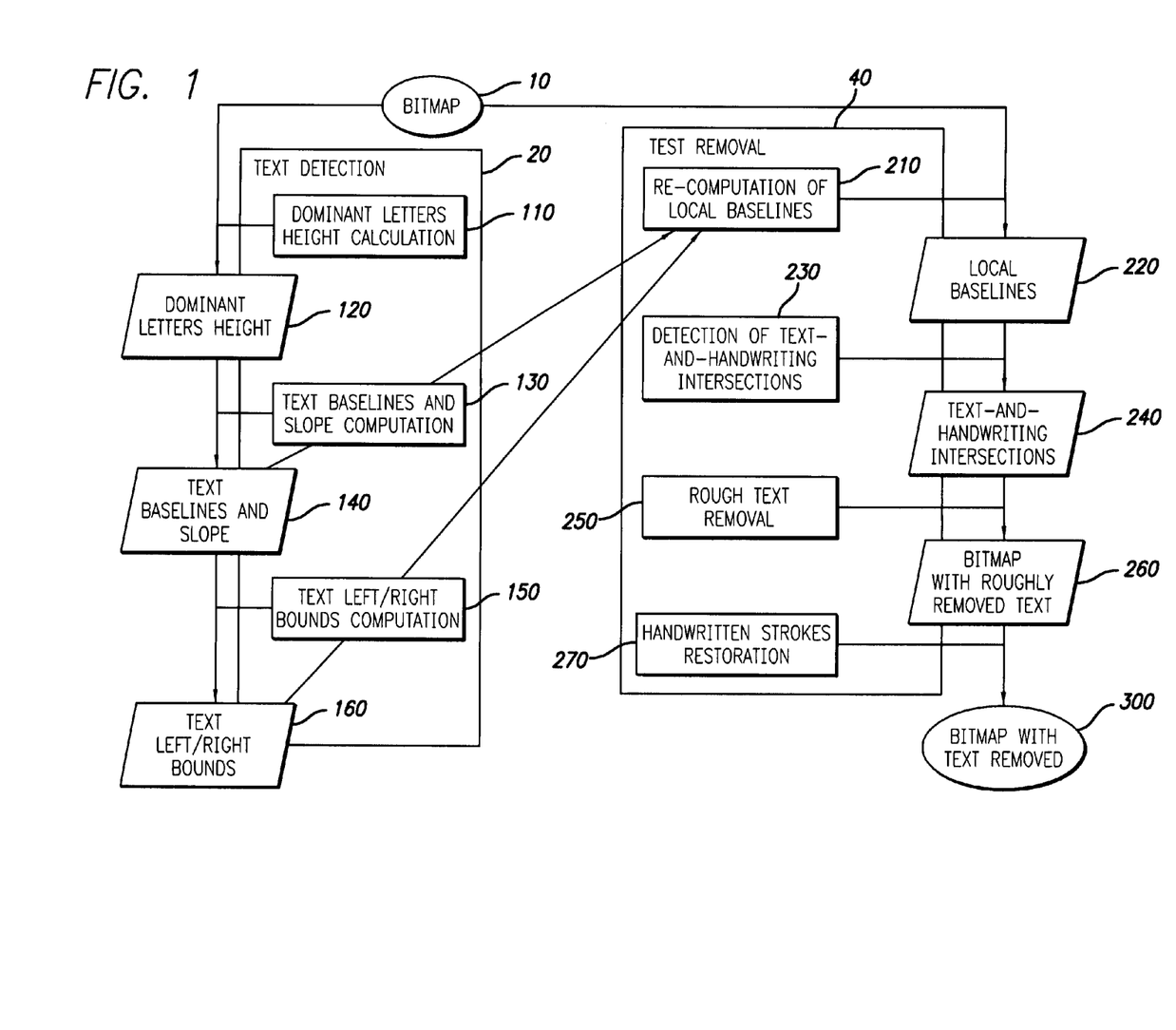
FIG. 1 is a flowchart illustrating a preferred method for automatic removal of text from a predetermined area of a document, in accordance with the principles of the present invention.

Referring to FIG. 1, a flowchart is depicted for the algorithm of the invention, which comprises a preferred method for automatic removal of text from a predetermined area of a document. In particular, an input to the algorithm of the invention comprises a bitmap 10 containing the predetermined area from which the text will be removed. In the preferred embodiment, the document comprises a financial document such as a check, and the predetermined area comprises the signature area of the financial document. Alternatively, the principles described herein may be employed for the removal of text from other regions of the financial document, or form other regions of non-financial documents, without departing from the scope of the invention.

The algorithm of the invention is targeted at finding and subsequently removing text comprising a single machine-printed text line from bitmap 10. For some applications, the algorithm may be applied iteratively to remove additional text lines from bitmap 10 until all of the targeted text lines are deleted. With continued reference to FIG. 1, text detection 20 comprises the steps 110, 130, 150, which are performed to determine presence of text and text parameters. Specifically, dominant letter height is calculated in step 1 10 to learn the vertical size of the text area, text baselines and slope are calculated in step 130 to learn the vertical location of text area, text left and right boundaries are calculated in step 150 to learn the horizontal location of the text area.

Figure 2:
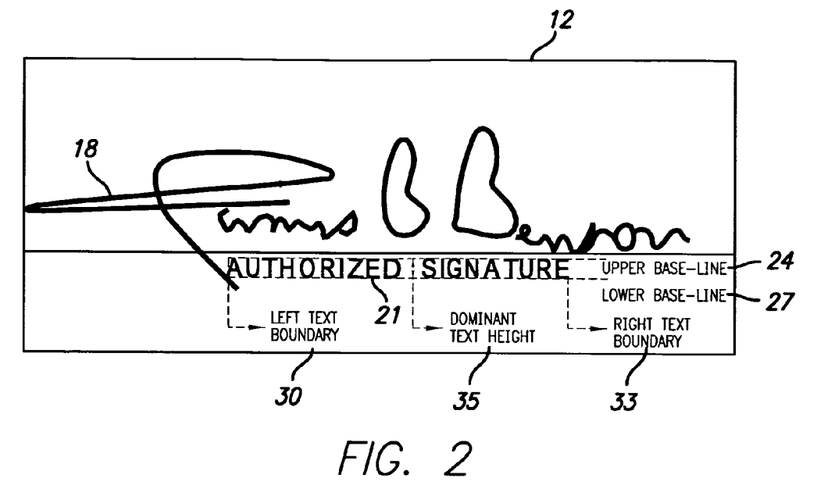
FIG. 2 illustrates the signature area of a financial document comprising a signature and a machine-printed text line after detection of upper and lower baselines as well as left and right boundaries.

Referring to FIG. 2, a signature area 12 of a financial document is illustrated comprising signature 18 and machine-printed text line 21, wherein the machine-printed text line includes upper baseline 24, lower baseline 27, left text boundary 30 and right text boundary 33. Dominant text height 35 is determined by measuring the difference between upper baseline 24 and lower baseline 27. In FIG. 1, step 110 is used to determine the value for dominant text height 120, which establishes the vertical size of text area 21 to be removed from signature area 12. Step 110 entails building a compressed image representation (matrix) with a 16×1 aspect ratio by keeping the vertical dimension unchanged or uncompressed (ratio 1:1) to maintain the accuracy, which is critical the in the vertical dimension. Compression in the horizontal dimension is designed to maintain the accuracy and provide a predetermined smoothing and compression effect. An aspect value of 16×1 is preferred for a ~200-240 dpi resolution and typical letter size. Additionally, the 16×1 aspect value enables improved efficient in computation trough lookup tables. Of course, different aspect ratios such as including 32×1 and 8×1 may be employed without departing from the scope of the invention.

Given an initial bitonal image zone I[H,W], wherein W is the width and H is the height of the image zone, a matrix M[h,W] is built, wherein h=H/16 and M[i,j]=ΣI[k,j] over all k values in the range of [i*16, (i+1)*16−1]. M[R, C] is a matrix with R rows and C columns, whereas M[r][c] equals the value of an element in M, which is located at the intersection of row r and column c. The argument value at which function F assumes its maximum value is defined as Argmax(F). A heights histogram is built comprising an array of integer values Heights[ ] in a range of all reasonable letter heights from minHeight to maxHeight for each voting point. A voting point is an <x,y,h>-triplet, which corresponds to an [x,y]-position in M and a value of h (height), wherein the following expressions are simultaneously true:

$$M[y-2][x]+M[y-2][x+1]<4$$

$$M[y][x]+M[y][x+1]>=1$$

$$M[y+2][x]+M[y+2][x+1]>=1$$

$$M[y+3+h][x]+M[y+3+h][x+1]<4$$

$$M[y+3+h][x]+M[y+3+h][x+1]>=1$$

$$M[y+3+h][x]+M[y+3+h][x+1]>=1$$

For the above expressions, each voting point increments the heights histogram Heights[h] by 1. If the maximum value in the Heights[ ] histogram exceeds a selected threshold value, then hDom=argmax(Heights[ ]) is accepted as the dominant text height. If the maximum value in the Heights[ ] histogram is less than or equal to the selected threshold value, the algorithm returns with a "no text found" return code.

In step 130, text baselines and slope are determined to identify the vertical location of the text to be removed. To calculate text baselines and slope, the following steps are applied, wherein hDom is the dominant text height 120: (1)

accumulating projections of voting points <x,y,hDom> in the 2D-histogram HistBase[skew][y], which projects all the points at various skew values in a range defined by [−maxSkew, maxSkew] to the Y-axis, where each voting point <x,y, hDom> increments HistBase[skew][y'] by 1, where y'=y+ (skew*x)/1024 and skew assumes values in the range of [−maxSkew, maxSkew] with skewStep-increment, where skew is measured in 1/1024 of tangent angle; (2) determining <bestSkew, bestY>=argmax(HistBase[ ][ ]); (3) returning with the "no text found" return code if bestVal1=HistBase [bestSkew][bestY]<threshold 1 (selected threshold value); (4) finding a second text line with the same skew positioned below the first line, wherein q maximum value of bestVal2=HistBase[bestSkew][bestY2] is determined in a range of bestY2 inside [bestY+hDom+deltaMin, bestY+ hDom+deltaMax], where deltaMin/deltaMax represents the possible range of gaps between two text lines and threshold 2<threshold 1 (second text line length may be shorter than first text line length); and (5) determining slope=bestSkew, upper baseline 24=bestY and lower baseline 27=bestY+ hDom (second line values for slope and baselines may be determined in a similar manner).

In step 150, text boundaries 30, 33 are calculated to determine the horizontal location of the text to be removed. This step involves determining the left boundary 30 of the text line inside the inclined image strip defined by baselines and slope, by moving the left boundary 30 to the right with 8-pixel step until the sum of black pixels in the 24 bits wide column of the strip is less than the selected threshold value. The right boundary 33 is determining in a similar manner. As illustrated in FIG. 1, text detection 20 results in the determination of dominant letter height 120, text baselines & slope 140 and text left & right bounds 160.

With further reference to FIG. 1, text removal 40 comprises the steps of re-computing local baselines (step 210), detecting text-and-handwriting intersections (step 230), removing rough text (step 250) and restoring handwritten strokes (step 270). Text removal 40 begins with the text location determined during test detection 20, and results in the determination of local baselines 220, text-and-handwriting intersections 240 and bitmap with roughly removed text 260. Output image 300 comprises bitmap 10 with accurately removed text.

Figure 3:
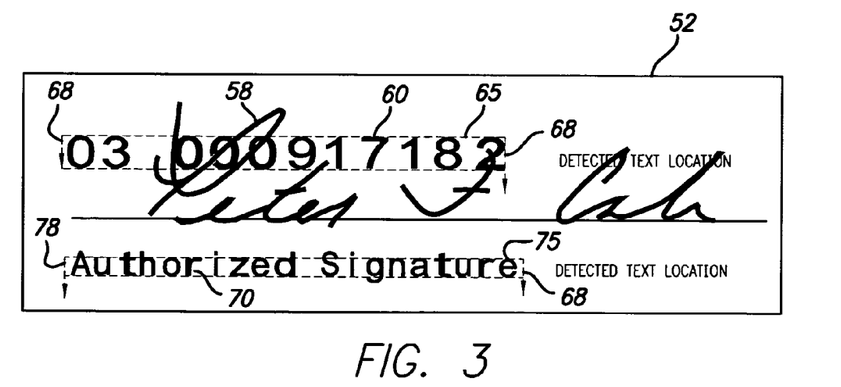
FIG. 3 illustrates the signature area of a financial document comprising a signature and a pair of machine-printed text lines including a pre-printed text line and an endorsement.
Figure 4:
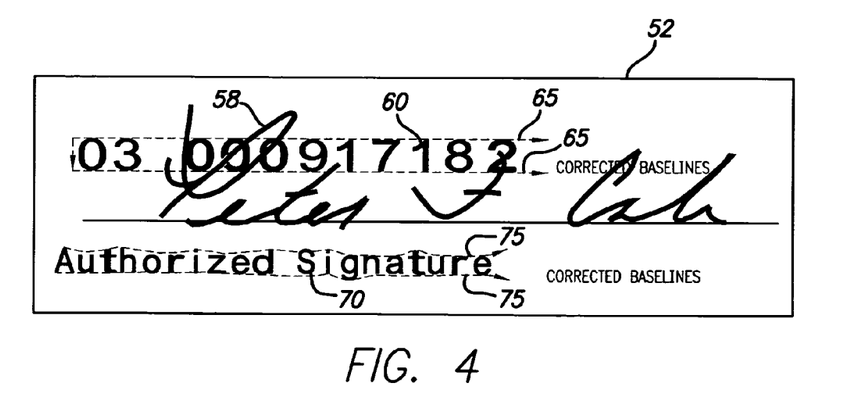
FIG. 4 illustrates the signature area of FIG. 3, wherein the text baselines have been locally corrected.

Referring to FIG. 3, a signature area 52 of a financial document is illustrated comprising signature 58 and machine-printed text lines 60, 70, wherein the machine-printed text lines 60, 70 include upper and lower baselines 65, 75, and left and right text boundaries 68, 78, respectfully. FIG. 4 depicts the signature area 52 of FIG. 3, wherein text baselines 65, 75 have been locally corrected or re-computed (step 210). Specifically, the text baselines 65 for machine-printed text line 60 remains substantially the same because the text is all uppercase. Contrariwise, the text baselines 75 for machine-printed text line 70 have been substantially corrected in FIG. 4 due to the presence of mixed-case text.

The re-computation of local baselines (step 210) is performed to correct the straight-line baselines (140) determined in step 130, in order to represent the vertical location of text more accurately, especially in the case of mixed-case text. The local baselines may be represented as two arrays (T[x] (top) and B[x] (bottom)), where index x is in the range of [leftBound, rightBound], with 8-pixel step. A value of (−1) indicates that no exact local baseline is found near the expected location. Otherwise, the array contains exact values of the vertical coordinate y when the intensity jump occurs. If the local baseline for x-value was not found, but it was found for (x−1) and (x+1) values (with 8-pixel step), and the difference between T[x−1] and T[x+1] is less than 3 pixels, T[x] is set to an average value of T[x−1] and T[x+1]. The same process is employed to determine the value for B[ ].

Figure 5A:
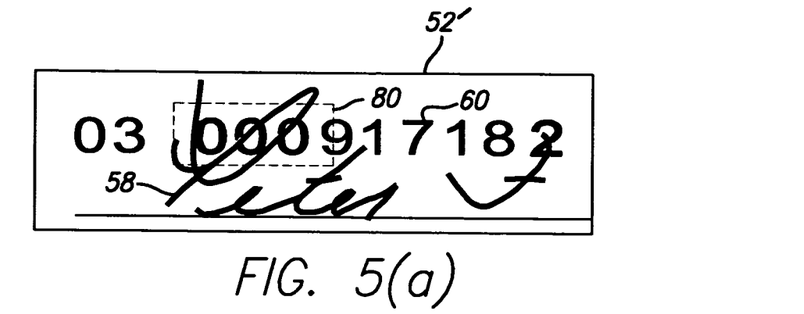
Figure 5B:
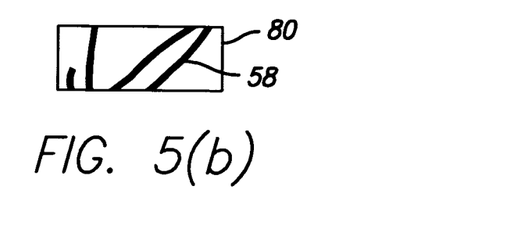

Referring to step 230, the software of the invention detects all points of intersection between machine printed text 60, 70 and signature 58 from signature area 52 of the financial document depicted in FIG. 3. In particular, signature 58 intersects with machine-printed text line 60 machine-printed text line, but does not intersect with machine-printed text line 70. Referring to FIG. 5(a), signature area 52' includes signature section 80 in which signature 58 intersects with machine-printed text line 60. Referring to FIG. 5(b), signature section 80 is illustrated without machine-printed text line 60, wherein the portion of signature 58 within signature section 80 is traced and then saved to enable signature restoration.

The detection of intersection points between text and handwriting involves tracing the handwritten strokes of the signature 58 to effectively separate the handwritten strokes from machine-printed text line 60. Signature restoration is enabled by collecting and saving the handwritten strokes. The following steps are applied to detect the intersection points: (1) checking for the presence of black segments above the top or below the bottom of the local baseline; (2) tracing the black segments from the top baseline downward (or from the bottom baseline upward), locating touching segments in the image line below the current segment while tracing, and selecting the nearest segment to the center of the current segment if more than one segment touches the current segment; (3) looking up the next 3 image lines if there is no segment touching the current segment in the adjacent image line, thereby allowing skipping the gaps up to 4 pixels height; (4) truncating the segment to maintain the previous segment length if the adjacent segment is 8 pixels longer than the current one, wherein truncation is done at the side with maximum difference between segment ends; and (5) collecting touching segments in an array Segm[ ], wherein the touching segments represent the parts of the signature or other objects that intersect with the text.

Figure 6A:
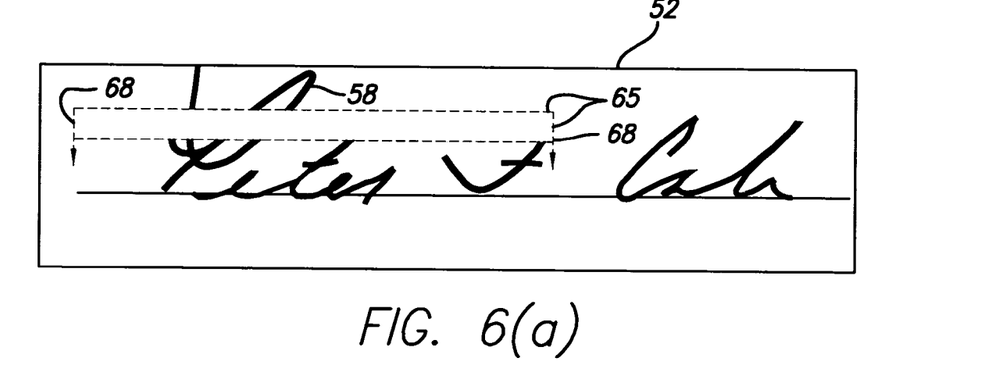
Figure 6B:
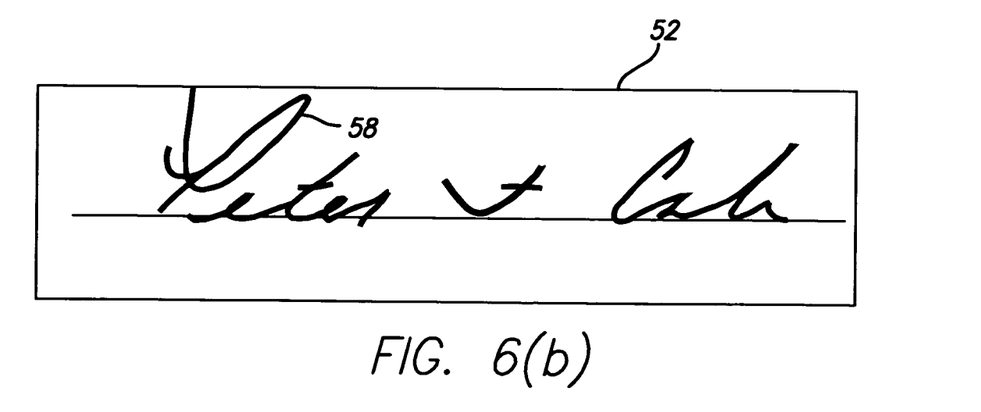

Referring to FIG. 6(a), in accordance with the invention, step 250 involves the removal of rough text from signature area 52, wherein the entire area of text within corrected baselines 65 is deleted or whited out. In FIG. 6(b), signature 58 has been repaired using the saved handwritten strokes that define signature section 80 in FIG. 5(b). During restoration of the handwritten stokes (step 270), the previously collected and saved handwritten strokes of signature section 80 is pasted back on the bitmap 10. In order to roughly remove the text, the columns between local baselines are whited out, which involves whiting out all pixels (x, y), where x is in the range of [leftBound, rightBound] (left and right text boundaries 68) and y is in the range of [T[x], B[x]] (upper and lower baselines 65). Referring to FIG. 1, to restore intersection parts after text zone whitening, the segments stored in the Segm[ ] array are re-inserted into the bitmap with roughly removed text 260, thereby producing output image 300 comprising the bitmap with accurately removed text. Output image 300 is the outcome of the text removal algorithm of the present invention.

Figure 7A:
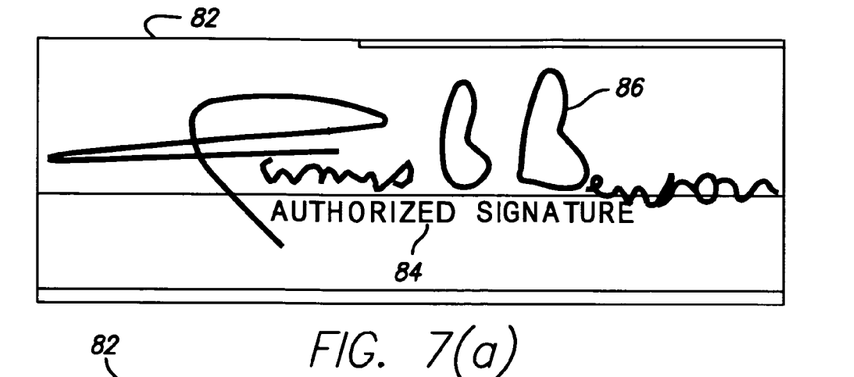
Figure 7B:
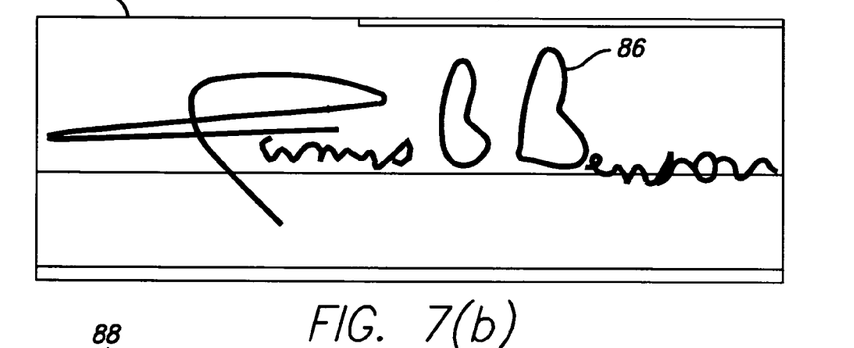
FIG. 7(b) depicts the signature area after removal of the machine-printed text.
Figure 8A:
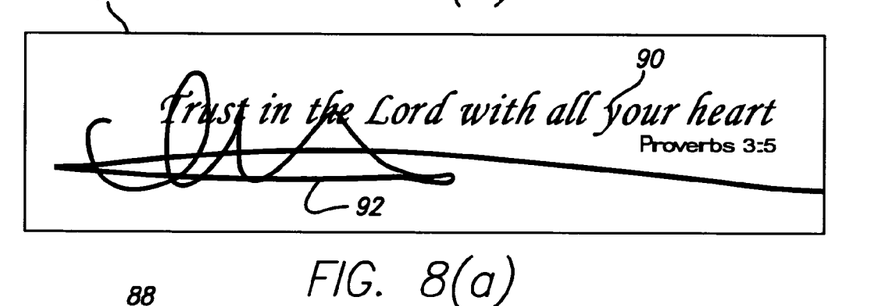
Figure 8B:
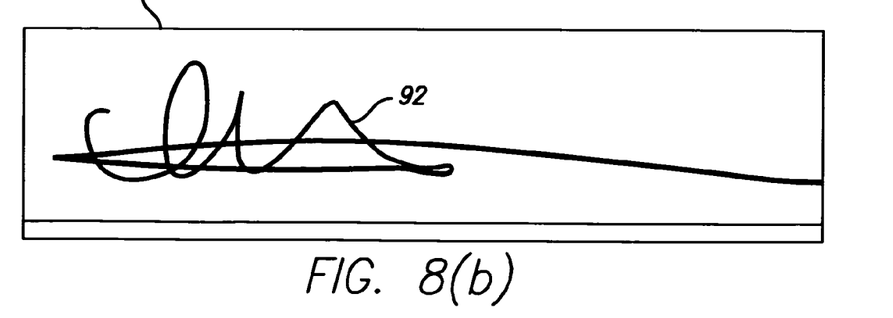
FIG. 8(b) depicts the signature area after removal of the machine-printed text.
Figure 9A:
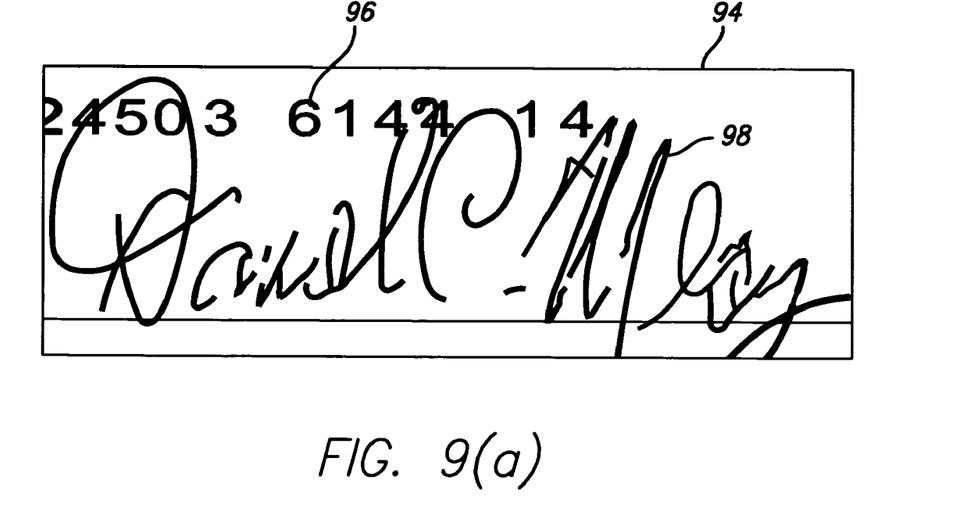
Figure 9B:
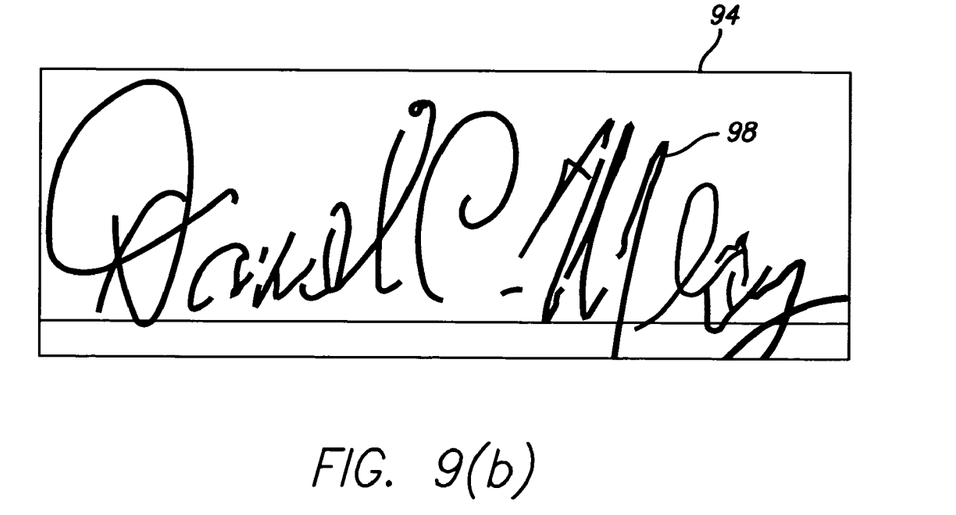
FIG. 9(b) depicts the endorsement area after removal of the machine-printed number sequence.

Referring to FIG. 7(a), signature area 82 of a financial document includes text 84 ("AUTHORIZED SIGNATURE") comprising an inscription that is located substantially underneath signature 86. FIG. 7(b) depicts signature area 82 after removal of text 84. Referring to FIG. 8(a), signature area 88 of a financial document includes text 90 ("Trust in the Lord with all your heart") comprising a citation that intersects with signature 92. FIG. 8(b) depicts signature area 88 after removal of text 90. Referring to FIG. 9(a), signature area 94 of a financial document includes text 96 ("24503 6144 14")

comprising an endorsement that intersects with signature 98. FIG. 9(*b*) depicts signature area 94 after removal of text 96. Such endorsements may contain bank names and locations, register and store number and locations, clerk ID's, machine and terminal identifiers and sequence numbers, and other information.

Thus, it is seen that a method for processing a financial document involving the automatic removal of text from the signature area of the financial document is provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

What is claimed is:

1. A document processing system, comprising:
   one or more computer software programs stored on a computer readable medium comprising machine readable instructions for running an algorithm for the automatically removal the text from the signature area of a document;
   wherein the document processing system provides a method for processing a document involving the automatic removal of text from a predetermined area of the document, the method comprising the steps of:
      inputting a bitmap containing the predetermined area of the document from which the text will be removed, wherein the predetermined area contains handwritten strokes;
      detecting the text;
      removing the text and any handwritten strokes that intersect with the text; and
      outputting the bitmap with the text removed therefrom.

2. The document processing system of claim 1, wherein: the document comprises a financial document; and the predetermined area comprises the signature area of the financial document.

3. The document processing system of claim 2, wherein the financial document comprises a check.

4. The document processing system of claim 1, further comprising the step of restoring any handwritten strokes that were removed from the predetermined area of the document.

5. The document processing system of claim 1, wherein the step of detecting the text comprises the steps of calculating a dominant letter height of the text, computing text baselines and slope of the text, and computing left and right boundaries of the text.

6. The document processing system of claim 1, wherein the step of removing the text and any handwritten strokes that intersect with the text comprises the steps of re-computing local baselines of the text, detecting intersections of handwritten strokes and text, and removing rough text from the re-computed local baselines.

7. The document processing system of claim 1, further comprising repeating the steps iteratively to remove additional text from the predetermined area of the bitmap.

8. A document processing system, comprising:
   one or more computer software programs stored on a computer readable medium comprising machine readable instructions for running an algorithm for the automatically removal the text from the signature area of a document;
   wherein the document processing system provides a method for processing a document, comprising the steps of:
      inputting a bitmap containing a predetermined area of the document, wherein the predetermined area contains handwritten strokes and text;
      detecting the text;
      removing the text and any handwritten strokes that intersect with the text;
      restoring any handwritten strokes that were previously removed from the predetermined area of the document; and
      outputting the bitmap with the text removed therefrom.

9. The document processing system of claim 8, wherein the step of detecting the text includes the step of calculating a dominant letter height of the text.

10. The document processing system of claim 9, wherein the step of calculating a dominant letter height comprises building a compressed image representation having a predetermined aspect ratio.

11. The document processing system of claim 8, wherein the step of detecting the text includes the step of calculating computing text baselines and slope of the text.

12. The document processing system of claim 8, wherein the step of detecting the text includes the step of calculating computing left and right boundaries of the text.

13. The document processing system of claim 8, wherein the step of removing the text and any handwritten strokes that intersect with the text includes the step of re-computing local baselines of the text.

14. The document processing system of claim 8, wherein the step of removing the text and any handwritten strokes that intersect with the text includes the step of detecting intersections of handwritten strokes and text.

15. The document processing system of claim 14, wherein the step of detecting intersections of handwritten strokes and text involves the step of tracing the handwritten strokes to effectively separate the handwritten strokes from the text.

16. The document processing system of claim 8, wherein the step of removing the text and any handwritten strokes that intersect with the text includes the step of removing rough text from the re-computed local baselines.

17. The document processing system of claim 8, wherein the step of restoring handwritten strokes comprises repairing the predetermined area of the document by pasting any previously collected and saved handwritten strokes back onto the bitmap.

18. The document processing system of claim 8, wherein: the document comprises a financial document; and the predetermined area comprises the signature area of the financial document.

19. The document processing system of claim 18, wherein the financial document comprises a check.

20. A document processing system, comprising:
   one or more computer software programs stored on a computer readable medium comprising machine readable instructions for running an algorithm for the automatically removal the text from the signature area of a document;
   wherein the document processing system provides a method for processing a document, comprising the steps of:
      inputting a bitmap containing a predetermined area of the document, wherein the predetermined area contains handwritten strokes and text;

calculating a dominant letter height of the text; computing text baselines and slope of the text;
computing left and right boundaries of the text; re-computing local baselines of the text;
detecting intersections of handwritten strokes and text;
removing rough text from the re-computed local baselines;

restoring any handwritten strokes that were previously removed from the predetermined area of the document; and outputting the bitmap with the text removed therefrom.

* * * * *